Patented Oct. 11, 1949

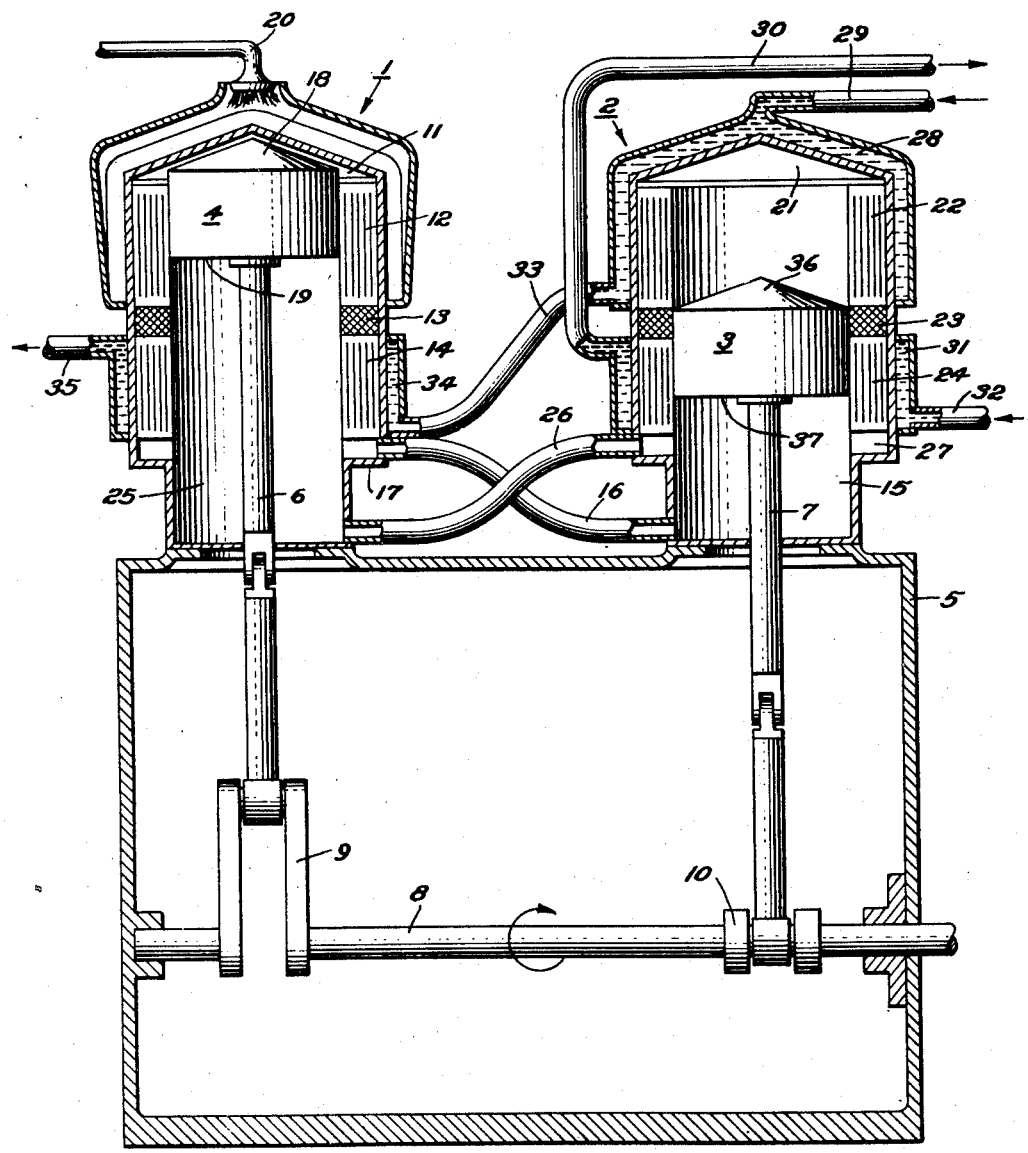

2,484,392

UNITED STATES PATENT OFFICE 2,484,392

HOT-AIR ENGINE ACTUATED REFRIGERATING APPARATUS

Willem Jan van Heeckeren, Eindhoven, Netherlands, assignor, by mesne assignments, to Hartford National Bank and Trust Company, Hartford, Conn., as trustee Application April 30, 1946, Serial No. 666,114
In the Netherlands August 30, 1945

8 Claims. (Cl. 62—136)

This invention relates to refrigerating engines in which the emission of heat is effected by means of a gaseous medium which is successively expanded and thus made heat-absorbing and compressed and thus made heat-emitting. This heat is carried away with the aid of a medium suitable for the purpose, such as water or air. This thermodynamic cycle is traversed in an engine in which the gas is enclosed in a space of variable volume in which means are present for transferring thermal energy of the medium or object to be cooled to the gas in the engine or, as the case may be, to a regenerator, and further in a second space of variable volume in which means are present whereby thermal energy of the medium in the engine is carried away to the exterior. The space adjoining the portion intended for the transmission of heat to the gas in the engine and the space adjacent the portion intended for extracting heat from the gas in the engine will be called hereinafter "cooled space" and "warmer" space respectively. Between the volume variations of the "warmer" and "cooled" spaces exists such a phase difference that the gas is forced to traverse the above-described thermodynamic cycle.

In order to obtain the required phase difference between the volume variations of the "warmer" and the "cooled" space it is necessary that two piston surfaces should be moved with the required phase difference. These two piston surfaces may be located either both in one cylinder or each in a separate cylinder. Consequently, if such a refrigerating engine is driven by any arbitrary motor, coupled to the crank shaft of the engine, at least two pistons, or bodies acting as pistons will always have to be driven by this crank shaft each individually from a crank driving rod mechanism. If the driving motor itself is a piston engine, at least three driving-rod crank mechanisms are required for the whole of the refrigerating aggregate.

The present invention has for its purpose to utilise a hot-gas motor for driving the refrigerating engine and to unite both in such manner that, as compared with the structure of two separate engines, a material simplification of the refrigerating aggregate is obtained.

A hot-gas motor is to be understood to mean a thermodynamic power engine in which a thermodynamic cycle is traversed by an amount of gas enclosed in a space of variable volume in which or in communication with which is a portion by which this gas is heated, or as the case may be, a regenerator and further a portion by which this gas is refrigerated and which is, in addition, in or in communication with a second space of variable volume. The spaces adjoining the heating portion and the cooling portion are termed "hot space" and "cold space" respectively.

Of this amount of gas enclosed in the said spaces a portion, if necessary, may be admitted into one or more separate closed tubes or vessels and afterwards readmitted from one or more of these tubes or vessels into the said spaces. In all these cases the thermodynamic cycle is termed "closed cycle."

The cooling portion of the motor may be omitted, if desired, and replaced by a periodic communication with the atmosphere, in which case a fresh amount of air is drawn in for each cycle. Such motors are termed "open-cycle motors." In motors with open cycle as well as in those with closed cycle there exists between the volume variations of the hot and cold spaces such a phase difference that the gas is successively submitted to heating, expansion, cooling and compression. The obtainment of the required phase difference between the volume variations of the hot and cold spaces of the hot-gas motor also necessitates at least two piston surfaces moving with this phase difference.

According to the present invention, the volume of the "cooled space" belonging to a cycle of the refrigerating engine and that of the "hot space" belonging to a cycle of the hot-gas motor are varied by a pair of piston surfaces firmly coupled to each other. Another pair of piston surfaces firmly coupled with each other varies the volume of the "warmer space" belonging to a cycle of the refrigerating engine, and that of the "cold space" belonging to a cycle of the hot-gas motor. If only one thermodynamic cycle is performed both in the hot-gas motor and in the refrigerating engine, only two pairs of piston surfaces which move with a certain phase difference suffice by the use of this invention for the whole of the refrigerating aggregate, since the phase difference required for the hot-gas motor may without objection be made equal, but inverse to the phase difference required for operating the above-described refrigerating engine. Each piston body has, irrespective of the running surface of the piston, two piston surfaces. Provided that in the aggregate only two cycles in total are performed, the cooled space of the hot-gas motor and the hot space of the refrigerating engine respectively are bounded by the piston surfaces of one piston, whereas the cold space of the hot-gas motor and the warmer space of the refrigerating engine are bounded by the piston surfaces of the other piston. Owing to this assembly the required number of pistons and associated driving-rod crank mechanisms is materially decreased so that the losses due to friction are reduced and the construction of the refrigerating aggregate is simplified.

If in the hot-gas motor as well as in the refrigerating engine more than one thermodynamic cycle is performed, a cycle of the hot-gas motor may be combined in the above-described manner with a cycle of the refrigerating engines so that only two pistons suffice for each cycle of the two engines.

The invention will be set out more fully by reference to the accompanying drawing showing, by way of example, one embodiment thereof.

The figure shows a two-cylinder refrigerating aggregate constituted by a hot-gas motor and a refrigerating engine which operates according to the same principle as the hot-gas motor but in which the cycle is performed in the reverse direction. The pistons 3 and 4 move in the two cylinders 1 and 2 with a phase displacement of approximately 90°. The two cylinders are placed on a common crank case 5 which is hermetically shut off from the surroundings and in which the crank shaft 8 together with the two cranks 9 and 10 placed at an angle of about 90° is moving. The piston 4 of the cylinder 1 is connected to the crank 9 by means of a piston and driving rod 6. The piston 3 in the cylinder 2 is similarly driven by the crank 10 through a piston and driving rod 7.

The cylinder 1 is realised as the cylinder of a common hot-gas motor, comprising a hot-space 11, a heater 12, a regenerator 13 and a cooler 14. The supply of heat to this cylinder is effected by means of a burner 20. The outlet of the cooler 14 has the shape of an annular channel 17, which is separated from the cylinder and which communicates, by means of a channel 16, with the cold space 15 under the piston 3 in the cylinder 2. The above-mentioned elements 11 to 15 jointly form a space in which the thermodynamic cycle of the hot-gas motor is performed. The volume of this space is varied, as is customary for hot-gas motors, by two piston surfaces moving with a mutual phase-displacement, that is to say by the upper surface 18 of the piston 4 in the cylinder 1 and by the lower surface 37 of the piston 3 in the cylinder 2. As mentioned above, there is a certain phase difference between the motions of the pistons 4 and 3, of which the said surfaces 18 and 37 respectively form part. The surfaces 18 and 37 vary the volumes of the hot space 11 and of the cold space 15 respectively, so that the above-mentioned conditions for the performance of a thermodynamic cycle of a hot-gas motor are fulfilled.

The thermodynamic cycle of the refrigerating engine is effected in the space formed by the space 21, the device 24 for the transmission of heat from the object or medium to be cooled to the gas in the cycle, the regenerator 23, the device 22 intended for the emission of heat from the cycle to the exterior, all housed in the cylinder 2, and the cooled space 25 housed in the cylinder 1. The device 24 ends in an annular channel 27 which communicates with the said space 25 by means of a conduit 26. This thermodynamic cycle therefore is also performed in a space which must be bounded by two piston surfaces moving with phase displacement, i. e. the cooled space 25 by one of the surfaces and the warmer space 21 by the other. However, the cycle of the refrigerating engine does not serve, as in a hot-gas engine, for the conversion of heat into energy but has, on the contrary, energy supplied to it in order thus to bring amounts of heat at a higher temperature. The cycle will consequently have to be traversed in a direction inverse to that of a hot-gas motor. Consequently, the reciprocatory movement relationship between the two piston surfaces by which the cooled and the warmer space respectively are bounded, must be opposite to that of a hot-gas motor. The numerical value of the phase difference between the same piston surfaces may, however, without objection be equal to that of a hot-gas motor. These two conditions imply therefore that the phase difference between the piston surfaces 18 and 37 is equal but inverse to the phase difference between the piston surfaces 36 and 19. Since the surface 18 in the direction of rotation of the motor leads with respect to the surface 37, the surface 36 has to lay by the same amount with respect to the surface 19. consequently, the surfaces 18 and 19 may be provided on each side of the same piston 4, with respect to which the piston 3 having the surfaces 36 and 37 is lagging. By uniting the hot-gas motor and the refrigerating engine in such manner that the cold space of the hot-gas motor lies in the same cylinder and its volume is varied by the same piston as the warmer space of the refrigerating engine, whereas the hot space of the motor lies in the same cylinder as the cooled space of the refrigerating engine and their volume is varied by another piston, only two pistons suffice for the two engines.

The external surface of the device 24 of the refrigerating engine may be located directly in the space to be cooled. This external surface may in the usual manner be provided with ribs for the purpose of enlarging the heat-absorbing surface. If between the object to be cooled and the refrigerating engine an intermediate medium is required, for example in the form of a condensing and vaporizing liquid, the device 24 may be surrounded by an envelope 31 in which the vaporized liquid is condensed. A conduit 32 serves for the supply of the vaporized liquid to be condensed. The cooling liquid is discharged through a conduit 30.

The emission of heat from the refrigerating engine as well as from the hot-gas motor may be effected for simplicity's sake by a single cycle of the cooling medium. The device 22 of the refrigerating engine and the cooler 14 of the hot-gas motor may externally be surrounded by envelopes 28 and 34 respectively. These two envelopes are traversed, through a set of conduits 29, 33 and 35, by a current of cooling water. It is advantageous that the cooling water at first flows around the device 22 of the refrigerating engine since this cooling medium then has its lowest temperature and the temperature of the refrigerating engine is thus maintained at the lowest possible value.

The above-described refrigerating engine fundamentally serves to increase the temperature of an amount of heat. Such engines are sometimes used for heating purposes and are in this case designated as "heat pumps."

The operation of the device, in sequence for every ninety degree turn of the shaft will now be described for one complete cycle of the apparatus beginning with the position shown in the figure.

As shown, piston 4 is at the uppermost position in cylinder 1. Piston 3, at the same time, is at the intermediate position in cylinder 2. Assuming the shaft 8 to be rotating in the direction of the arrow, during the first 90° of rotation from the position shown, cranks 9 and 10 will be moving downwardly approximately the same distance per unit of time. As a result, piston 4 will be reaching the intermediate position in cylinder 1 at the same time piston 3 will be reaching its lowermost position in cylinder 2. Thus the gas volume delimited by piston surfaces 37 and 18 will be displaced at substantially constant volume from "cold space" 15, through cooler 14, regenerator 13 (where heat stored during a previous cycle will be taken up by the gas passing therethrough), heater 12 (where additional heat from burner 20 is taken up by the gas), and thence to the "hot space" 11. Simultaneously, the separate gas volume delimited by piston surfaces 36 and 19 will likewise be displaced at substantially constant volume. The displacement will occur through conduit 20, through device 24 (for the transmission of heat from the medium to be cooled to the gas), through regenerator 23, (where heat from the gas is given up thereto), through the device 22 (for the emission of heat from the cycle to the exterior of the apparatus), and finally into the "warmer space" 21.

In the next 90° of rotation of shaft 8, crank 9 will still be traveling downwardly whereas crank 10 will now be moving in an upward direction. Thus, piston 4 will be moving downwardly at the time piston 3 is now moving upwardly. At this time, the gas in hot space 11 is expanding due to the heating thereof as it passes through heater 12. The heat expansion is transformed into work as the pressure in the hot chamber is transmitted to surface 37 of piston 3 via conduit 16 and cold space 15. The piston 3 is forced upwardly thereby. Shaft 8 is turned in the direction of the arrow by means of the rod crank linkage 7, 10. During the period of rotation just defined, with piston 4 descending and piston 3 ascending, the gas in the "cooled space" 25 and "warmer space" 21 will be compressed.

In the next 90° of rotation, cranks 9 and 10 will both be moving upwardly and with them pistons 4 and 3, respectively. At such time, the expanded gas in "hot space" 11 will be displaced towards "cold space" 15 through heater 12, regenerator 13 to which heat will be given from the gas and then through cooler 14 where the gas is further cooled. At the same time, the gas in "warmer space" 21 will be displaced towards "cooled space" 25 through cooler 22, regenerator 23, device 24, and conduit 26.

As the rotation of the shaft continues in the next 90° arc towards the positions of the pistons and linkages as shown in the figure, crank 9 is moving upwardly as crank 10 is moving downwardly and pistons 4 and 3, respectively, are moving in the same manner. At such time, the volume of gas between surfaces 18 and 37 is being compressed in the "hot space" "cold space" system while the volume of gas between surfaces 36 and 19 is being expanded in the "warmer space" "cooler space" system until such time as the position shown in the figure is reached. After that, the cycle repeats as described hereinbefore.

What I claim is:

1. A combined hot gas piston engine and refrigerating device comprising means forming a hot space for said engine, means forming a cooled space for said refrigerator, means forming a cold space for said engine, means forming a warmer space for said refrigerator, conduit means connecting said hot space and said cold space, second conduit means connecting said cooled space and said warmer space, a piston separating said hot space from said cooled space, a second piston separating said warmer space from said cold space, and means for mechanically connecting said pistons so that the movements thereof show a predetermined phase displacement.

2. A combined hot gas piston engine and refrigerating device comprising two cylinders, a piston in one cylinder separating a hot space for said engine from a cooled space of said refrigerator, a second piston in the other cylinder separating a warmer space for said refrigerator from a cold space for said engine, conduit means connecting said hot space and said cold space, second conduit means connecting said cooled space and said warmer space, a crankshaft, and means connecting said pistons to said crankshaft for causing movement of said pistons to occur in displaced phase relationship to each other.

3. A combined hot gas piston engine and refrigerating device comprising a first cylinder and a second cylinder, a first piston in said first cylinder having a top face and a bottom face, said top face of said piston defining one end of a hot space in said first cylinder, said bottom face of said piston defining one end of a cooled space in said cylinder, a second piston in said second cylinder having a top face and a bottom face, said top face of said second piston defining one end of a warmer space in said second cylinder, said bottom face of said second piston defining a cold space in said second cylinder, first fluid conducting means connecting the other end of said hot space with the other end of said cold space, second fluid conducting means connecting the other end of said cooled space with the other end of said warmer space, a crankshaft, and means connecting said first piston and said second piston to said crankshaft.

4. A combined hot gas piston engine and refrigerating device comprising a first cylinder and a second cylinder, a first piston in said first cylinder having a top face and a bottom face, said top face of said piston defining one end of a hot space in said first cylinder, said bottom face of said piston defining one end of a cooled space in said cylinder, a second piston in said second cylinder having a top face and a bottom face, said top face of said second piston defining one end of a warmer space in said second cylinder, said bottom face of said second piston defining a cold space in said second cylinder, first fluid conducting means connecting the other end of said hot space with the other end of said cold space, second fluid conducting means connecting the other end of said cooled space with the other end of said warmer space, a crankshaft, means connecting said first piston to said crankshaft, means connecting said second piston to said crankshaft, said last two mentioned means being so constructed and arranged that the movements of the first piston and the second piston show a phase difference therebetween.

5. A combined hot gas piston engine and refrigerating device comprising a first cylinder and a second cylinder, a first piston in said first cylinder having a top face and a bottom face, said top face of said piston defining one end of a hot space in said first cylinder, said bottom face of said piston defining one end of a cooled space in said cylinder, a second piston in said second cylinder having a top face and a bottom face, said top face of said second piston defining one end of a warmer space in said second cylinder, said bottom face of said second piston defining a cold space in said second cylinder, first fluid conducting means connecting the other end of said hot space with the other end of said cold space, second fluid conducting means connecting the other end of said cooled space with the other end of said warmer space, heater means and cooler means located in series in said first fluid conducting means, said heater means being closer to said hot space than in said cooler means, means for the extraction of heat from the refrigerating cycle and means for the transmission of heat from the exterior to the refrigerating cycle located in series in said second fluid conducting means, said means for the extraction of heat from the refrigerating cycle being closer to said warmer space than is said means for the transmission of heat from the exterior to the refrigerating cycle, a crank shaft, means connecting said first piston to said crankshaft, means connecting said second piston to said crankshaft, said last two mentioned means being so constructed and arranged that the movements of the first piston and the second piston show a phase difference therebetween.

6. A combined hot gas piston engine and refrigerating device as claimed in claim 5 wherein the phase difference between the movements of the first and second piston is substantially 90°.

7. A combined hot gas piston engine and refrigerating device as claimed in claim 5 wherein a first regenerator means is located in said first fluid conducting means between said heater means and said cooler means and a second regenerator means is located in said second fluid conducting means between said means for the extraction of heat from the refrigerating cycle and said means for the transmission of heat from the exterior to the refrigerating cycle.

8. A combined hot gas piston engine and refrigerating device as claimed in claim 5 wherein said cooler means and said means for the extraction of heat from the refrigerating cycle are interconnected by a third fluid conducting means.

WILLEM JAN van HEECKEREN.

REFERENCES CITED

The following references are of record in the file of this patent:

UNITED STATES PATENTS

| Number | Name | Date |
| --- | --- | --- |
| 1,169,308 | Vuia | Jan. 25, 1916 |
| 1,240,862 | Lundgaard | Sept. 25, 1917 |
| 1,879,563 | Smith | Sept. 27, 1932 |
| 2,011,964 | Ajam | Aug. 20, 1935 |
| 2,272,925 | Smith | Feb. 10, 1942 |